(12) United States Patent
Chen et al.

(10) Patent No.: US 6,495,258 B1
(45) Date of Patent: Dec. 17, 2002

(54) STRUCTURES WITH HIGH NUMBER DENSITY OF CARBON NANOTUBES AND 3-DIMENSIONAL DISTRIBUTION

(75) Inventors: Zheng Chen, Auburn, AL (US); Yonhua Tzeng, Auburn, AL (US)

(73) Assignee: Auburn University, Auburn University, AL (US)

(*) Notice: Subject to any disclaimer, the term of this patent is extended or adjusted under 35 U.S.C. 154(b) by 0 days.

(21) Appl. No.: 09/665,751

(22) Filed: Sep. 20, 2000

(51) Int. Cl.$^7$ .................................................. B32B 9/00
(52) U.S. Cl. ........................ 428/408; 428/379; 428/457
(58) Field of Search ................................ 428/408, 379, 428/457, 325

(56) References Cited

U.S. PATENT DOCUMENTS

| | | | | |
|---|---|---|---|---|
| 5,439,740 A | * | 8/1995 | Gat | 428/379 |
| 5,489,477 A | * | 2/1996 | Ohta et al. | 428/408 |
| 5,558,903 A | * | 9/1996 | Bhushan et al. | 428/408 |
| 5,614,272 A | * | 3/1997 | Shah | 427/577 |

OTHER PUBLICATIONS

S. Iijima, Nature 354, 56 (1991).
C. Journet and P. Bernier, Appl. Phys. A 67, 1–9 (1998).
A. Fonseca and coworkers, Appl. Phys. A 67, 11–22 (1998).

* cited by examiner

Primary Examiner—Archene Turner
(74) Attorney, Agent, or Firm—Eugene I. Snyder

(57) ABSTRACT

A composite is described having a three dimensional distribution of carbon nanotubes. The critical aspect of such composites is a nonwoven network of randomly oriented fibers connected at their junctions to afford macropores in the spaces between the fibers. A variety of fibers may be employed, including metallic fibers, and especially nickel fibers. The composite has quite desirable properties for cold field electron emission applications, such as a relatively low turn-on electric field, high electric field enhancement factors, and high current densities. The composites of this invention also show favorable properties for other an electrode applications. Several methods, which also have general application in carbon nanotube production, of preparing these composites are described and employ a liquid feedstock of oxyhydrocarbons as carbon nanotube precursors.

7 Claims, 3 Drawing Sheets

STRUCTURES WITH HIGH NUMBER DENSITY OF CARBON NANOTUBES AND 3-DIMENSIONAL DISTRIBUTION

ACKNOWLEDGEMENT

The U.S. Government has a paid-up license in this invention and the right in limited circumstances to require the patent owner to license others on reasonable terms as provided for by the terms of N00014-98-10571 awarded by the Office of Naval Research (ONR) and by the terms of NCC5-165 awarded by the National Aeronautic and Space Administration (NASA) and by the terms of SUB97-055 awarded by the University of Alabama at Huntsville under the above NASA contract.

FIELD OF THE INVENTION

This application relates to carbon nanotubes. More particularly, it relates to structures and their preparation containing 3-dimensional distributions of carbon nanotubes, where the number density of the carbon nanotubes per unit volume far exceeds that previously possibly by prior art methods. Our application specifically relates to the preparation of carbon nanotubes on and within a nonwoven network of small diameter interconnected fibers, including novel general methods of carbon nanotube preparation, the structures resulting therefrom, and some selected properties of these novel structures.

BACKGROUND OF THE INVENTION

Although graphite and diamond have long been known as structures available to elemental carbon, the preparation of carbon structures in the form of C60 and other fullerenes has sparked intense investigation of even more novel molecular carbon structures. An early discovery was that of carbon nanotubes (S. Iijima, Nature 354, 56 (1991)), which are helical microtubules of graphitic carbon. The simplest carbon nanotubes are single-walled, i.e., a tube formed from a graphitic sheet rolled up on itself with a helical pitch and joined seamlessly at the edges. Usually such tubes are capped at the end to afford a closed tubule with a conical cap. Diameters of 10–20 Angstroms are common.

Multi-walled carbon nanotubes are one step up in complexity and consist of a multiplicity of concentric tubes, each formed by closure of a graphitic sheet, with the distance between concentric tubes being about 0.34 nm, which is the spacing between sheets of graphite. Multi-walled carbon nanotubes may contain only 2 concentric tubes, or may contain 50 or more concentric tubes.

The preparation of carbon nanotubes is possible using diverse methods; see C. Journet and P. Bernier, Appl. Phys. A 67, 1–9 (1998), for a review of preparative methods. Electric arc discharge is perhaps the most widely used technique to produce nanotubes and is based on an electric arc discharge generated between two graphite electrodes in an inert atmosphere such as helium or argon. A plasma, with a temperature on the order of 4000° K, is created between two closely spaced electrodes and carbon is sublimed from the anode onto the cathode. Normally only multi-walled carbon nanotubes are formed by this method, but if a metal is introduced as a catalyst (e.g., Co, Ni, Fe, Lu, and combinations thereof) single-walled carbon nanotubes also may be formed.

Laser ablation, the first technique used to generate fullerene clusters in the gas phase, may be used to vaporize graphite in an inert atmosphere. In this method a laser beam is scanned across a heated graphite target area over which flows an inert gas such as helium or argon. Carbon species produced are swept by the gas onto a cooled target, e.g., copper. Where the graphite is heated to 1200° C., closed multi-walled carbon nanotubes with 2–24 graphitic layers and a length of up to 300 nm were formed. However, when a small amount of a transition metal is added to graphite, single-walled carbon nanotubes are the predominant product. These tend to organize into rope-like crystallites 5–20 nm in diameter and up to several hundred microns long. An advantage of this method for production of single-walled carbon nanotubes is that very little soot accompanies nanotube formation.

High-temperature gas phase decomposition of hydrocarbons also can be utilized to form carbon nanotubes. For example, nitrogen containing 10% acetylene passed over a catalyst of, e.g., Co or Fe at 500–1100° C. results in the formation of multi-walled carbon nanotubes. However, encapsulated metal often is found inside the tubes. One feature when using a support of, e.g., silica or a zeolite, is that the carbon nanotubes formed are not covered by amorphous carbon, as is the case with many other methods. In the work of A. Fonseca and coworkers, Appl. Phys. A 67, 11–22 (1998), ion-exchanged Co—Y zeolite was inactive in the formation of carbon nanotubes, whereas Co-impregnated Y zeolite was quite effective in carbon nanotube production. This showed that carbon nanotubes were formed on the zeolite surface, not in the pores, and thus carbon nanotube deposition (being only at the zeolite surface) can be viewed as having only a two-dimensional distribution. This is an important observation to which we shall return.

Carbon nanotubes have received a great deal of attention in part because of their interesting and sometimes unique properties which make them attractive in many potential applications. Their high strength-to-weight ratio makes carbon nanotubes one of the stiffest materials ever made. Whereas traditional carbon fibers have a strength-to-weight ratio about 40 times that of steel, carbon nanotubes have a strength-to-weight ratio of at least 2 orders of magnitude greater than steel. Carbon nanotubes also show outstanding flexibility and elasticity. Theoretical studies suggest a Young's modulus as high as 1–5 Tpa, and some measurements have provided an average value of 2 Tpa. Being graphitic, one can expect carbon nanotubes to show high chemical and thermal stability. Recent oxidation studies have shown that the onset of oxidation shifts by about 100° C. to higher temperatures in carbon nanotubes compared to graphite fibers. Theoretical considerations predict that carbon nanotubes will show high thermal conductivity in the axial direction.

Whether carbon nanotubes are conductors or semiconductors depends upon the helical pitch of the graphitic sheets forming the nanotube. One of the most important properties of carbon nanotubes in this invention is that of field emission of electrons. Because of the small radius of curvature of the end caps in carbon nanotubes, electrons can be easily extracted into a vacuum by a relatively small external electric field. Since carbon nanotubes may be deposited on large substrates, this makes them suitable for applications such as flat panel displays. Compared with other carbon-based cold cathode electron field emission materials, carbon nanotubes have relatively low turn-on electric field and high current density, arising mainly from the high field enhancement factor introduced by their very high aspect ratio and small curvature.

In cold field emission applications, it should be clear that it is highly desirable to obtain maximum electron flux from a given material Where carbon nanotubes are the emission source, it thus follows that what is required are structures having the largest possible number of nanotubes per unit cathode surface area that actually emit electrons. We have previously noted that although prior methods produce large numbers of carbon nanotube deposition in a 2-dimensional distribution, i.e., on the surface of whatever material is used as a substrate, only a very small faction of the carbon nanotubes contribute to electron field emission. Only those carbon nanotubes that are taller than others and therefore at a smaller distance to the anode are subjected to the higher electric field necessary for electron field emission. When the applied voltage is increased in order to raise the local electric field at the tips of those shorter carbon nanotubes, the electric field becomes too high for taller carbon nanotubes causing them to be damaged by overheating because too high a current is forced to flow through too few carbon nanotubes. Using a porous substrate such as silica or a zeolite provides no exception; nanotube formation is limited to the substrate surface and fails to occur within the substrate pores. Clearly, then, what is needed is a substrate which provides the macroporosity requisite for a 3-dimensional deposition of carbon nanotubes. The resulting material has a sponge-like structure with carbon nanotubes distributed throughout the material, rather than solely on the surface. By suppressing the growth of carbon nanotube on the surface of the substrate and allowing carbon nanotubes to grow inside the pores of the macroporous substrate or by removing carbon nanotubes that stick out of the macroporous substrate surface, only carbon nanotubes residing below the macroscopic substrate surface are contributing to the electron emission. This method minimizes the burnout of longer or taller carbon nanotubes as it would occur in the case when carbon nanotubes are allowed to grow only on the surface of the cathode as explained previously. As a result, the number of electrons emitted per unit macroscopic cathode surface area is maximized. Our invention affords just such a sponge-like material using a broad class of substrates with varying properties.

Another important property of the sponge-like carbon nanotube structure described in this invention is the extremely large effective surface area per unit volume as well as per unit weight. This property is highly desirable for electrode applications that require as large an electrode surface area as possible. The sponge-like carbon nanotube can serve as highly effective electrodes for a super-capacitor, a high energy density battery, and a high density catalyst support applications, to name a few.

In particular, our invention uses a 3-dimensional nonwoven network of interconnected randomly oriented fibers as a substrate. Such a substrate has high macroporosity arising from the interstices between the fibers and affords many places where carbon nanotubes can grow. Additionally, the nanotubes grow on the fiber surfaces, generally perpendicular to, but sometimes at an angle to, the fiber axis, so that there results a high density of formed carbon nanotubes per unit volume. We also have provided several methods of producing such carbon nanotubes on our substrate so as to provide several optional preparative methods, each with their own advantages. These preparative methods, even though particularly valuable to production of our sponge-like materials, have general applicability to carbon nanotube formation and may be advantageously utilized with substrates different from ours.

SUMMARY OF THE INVENTION

Figure 1:
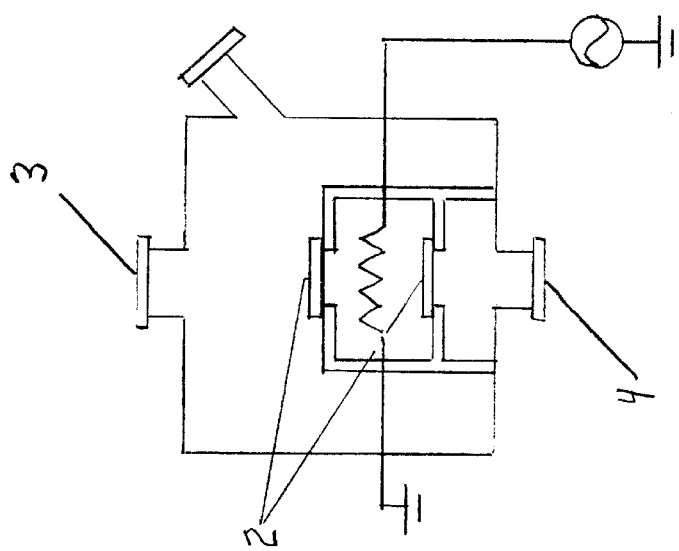
FIG. 1 is a diagram of the apparatus used in the hot filament chemical vapor deposition process.

The purpose of this invention is to prepare three-dimensional dispersions of carbon nanotubes directly on macroscopically porous substrates. In one embodiment our invention is a composite comprising a nonwoven network of randomly oriented, interconnected fibers having macroporous regions within the network, and carbon nanotubes dispersed within said network, including the macroporous regions. In a more specific embodiment the fibers are nickel fibers. In a yet more specific embodiment the fibers are nickel fibers sintered together at their crossing points. Another embodiment comprises the preparation of said composite by chemical vapor deposition whereby a suitable hydrocarbon or organic oxygenate is decomposed at the surface of a hot wire filament to form carbon nanotube precursors, and said precursors are conducted to a substrate of randomly oriented, interconnected fibers having macroporous regions within the network to form carbon nanotubes on the fibers and within the macroporous regions. Still another embodiment comprises the preparation of said composite by chemical vapor deposition utilizing a plasma to generate carbon nanotube precursors. Other embodiments will be apparent from the ensuing description.

DESCRIPTION OF THE INVENTION

We previously have noted the importance of having a high density of carbon nanotubes for cold field emission of electrons and high effective surface area electrode applications. We also have previously noted that prior art methods of depositing carbon nanotubes on substrates leads to a 2-dimensional distribution (i.e., only surface deposition) which limits carbon nanotube density and the low fraction of carbon nanotubes contributing to field emission of electrons. This application will describe a class of composites which contain a 3-dimensional distribution of carbon nanotubes thus affording a more desirable 3-dimensional distribution of carbon nanotubes and a higher number density of nanotubes than previously obtained and obtainable.

We start with a network of nonwoven, randomly oriented fibers (structure-forming fibers) which are connected at their crossing points. We use the term "network" in the usual dictionary definition, i.e., a structure of [cords or wires] that cross at regular intervals and are knotted or secured at the crossing. See Webster's Seventh New Collegiate Dictionary, G. & C. Merriam Co., (1970), p. 568. We note that the networks of our invention are three dimensional in the sense that the diameter of the largest of the structure-forming fibers is small relative to the thickness of the article, and that the network in question has multiple layers of discrete fibers. In the context of the definition of a network, the structure-forming fibers in our network may cross in different planes, consequently it follows that the fibers will not be in contact at all crossing points. In this application "junctions" refers to the crossing points in the network of structure-forming fibers where the latter are in contact with each other. We also note that the network of this invention is macroporous, i.e., it contains relatively large empty regions (macropores) which constitute the space between fibers. In fact, in many such networks the fiber density is such that the article constitutes largely macropores spanning the fibers of this invention.

A purpose of the structure-forming fibers in our composite is to provide mechanical integrity and strength to the article, i.e., to provide an overall physical structure and framework to hold carbon nanotubes in place. In the case of electrical or electrochemical applications, the structure-forming electrically conductive fibers in our composite also provide good electrical conductivity to minimize energy loss. To achieve this the structure-forming fibers are connected at a multiplicity of their junctions, i.e., at those crossing points where the structure-forming fibers are in contact with each other. For the purpose of our invention the structure-forming fibers are connected by being either sinter-bonded or friction-locked. By "sinter-bond" is meant a fusion or welding together of the structure-forming fibers where they touch each other. This generally is effected by heat to the point where the structure-forming fibers just begin to diffuse sufficiently for fusion to occur at their junction. By "friction-lock" is meant an intermeshing of the structure-forming fibers which are held together by their mutually rough surfaces coming into contact and impeding one sliding over the surface of the other.

The diameters of the structure-forming fibers used in the practice of this invention are more dependent on commercial availability, ease of preparation, and cost than on any theoretical or practical limitations. Small diameters are preferred for strength and mechanical integrity of the composite. Ideally, fibers on the order of 0.5–50 microns would be the most desirable ones. However, commercial availability generally limits fiber diameters to the range of 2–20 microns.

A broad variety of fibers may be used in the practice of our invention and include metal fibers, ceramic fibers, carbon fibers, metal alloy fibers, and metal graphite fibers, as well as combinations of the foregoing. Examples of metals suitable for use as fibers in our invention include nickel, molybdenum, stainless steel, copper, tungsten, aluminum, titanium, vanadium, chromium, iron, cobalt, zinc, zirconium, niobium, ruthenium, rhodium, palladium, silver, cadmium, indium, tin, hafnium, tantalum, rhenium, osmium, platinum, gold, antimony, beryllium, iridium, silicon, and combinations thereof. Alloys also may be used as fibers in the practice of our invention and include materials such as constantan, hastelloy, nichrome, inconel, monel, Ti alloys, carpenter's metal, and iron alloys generally. Of the foregoing nickel fibers are particularly well suited in the practice of our invention and are therefore preferred.

Ceramic materials constitute another class of fibers suitable for use in our invention. These include materials such as silica, magnesia, alumina, titania, aluminosilicates, aluminophosphates, silicaaluminophosphates, clays, boron nitride, aluminum nitride, silicon nitride, silicon carbide and combinations thereof. Carbon fibers, whether activated or not, also are suitable in the practice of our invention, to afford an all-carbon composite. Although there appears to be no particular advantage to having networks of mixtures of classes of fibers, we note this is feasible in the context of our invention.

The network of nonwoven, structure-forming fibers connected at their junctions serves as the substrate for deposition of carbon nanotubes. We will defer discussion of the methods of deposition of carbon nanotubes on this substrate, but note that several methods are available to afford suitable composites of carbon nanotubes deposited on all surfaces of the fibers as well as a portion thereof extending within and occasionally bridging the macroporous regions so as to give a three-dimensional distribution of nanotubes. Deposition of carbon nanotubes on the cylindrical surface of the fibers themselves affords a composite with a high density of carbon nanotubes per unit volume. However, the tendency for the nanotubes to grow into the macroporous region, sometimes bridging this region, increases the nanotube density still further. Additionally, it affords a sponge-like structure favorable to high electron density when the nanotube composite is used as a cold field emission source. In fact, it is this sponge-like, three dimensional distribution which is responsible for the high electron densities in the composites of our invention.

Whatever the method of deposition of carbon nanotubes on the substrates described above, we have confirmed observations of others that the balance between multi-walled carbon nanotubes and single-walled carbon nanotubes depends upon conditions of nanotube formation. In particular, deposition of certain metals upon the substrate prior to nanotube deposition favors formation of single-walled carbon nanotubes; in their absence multi-walled carbon nanotubes are formed in large predominance. What we have further noted is that deposition of such metals per se is not the most effective way to catalyze nanotube formation, but that particle size is a critical factor. We have further noted that small particle size is favored by decomposition of suitable metal salts in situ on the substrate. For example, nickel is a good catalyst favoring single-walled carbon nanotubes, yet deposition of carbon nanotube precursors on a substrate of nickel fibers leads predominantly to multi-walled carbon nanotubes. Thus, bulk nickel is not an effective catalyst. But if the nickel fibers are first coated with nickel chloride, as an example of a suitable nickel salt, the latter decomposes under the high temperature conditions attending carbon nanotube deposition to afford metallic nickel as small particles on the surface of the nickel wire. These nickel particles now are quite effective as a catalyst, and in this case the nanotubes deposited on the substrate are largely single-walled carbon nanotubes.

This same technique may be utilized generally on the network of nonwoven, structure-forming fibers connected at their junctions serving as the substrate of our invention, regardless of the nature of the fibers. Metals which act as catalysts include nickel, cobalt, copper, ruthenium, iron, platinum, and palladium. In all cases it is desirable that a suitable salt of one (or some combination) of the foregoing metals be "painted" onto the fibers of the substrate. At nanotube deposition conditions, the salt decomposes to afford small particles of the metal which then serve as a catalyst. It should be clear that the only condition for suitability of a salt of the foregoing metals is that it decompose to afford the elemental metal; no other prerequisites or conditions need be met.

The composites which are our invention may be made by many processes, and the nature of the process employed is not particularly important. However, we prefer using two variants of the chemical vapor deposition (CVD) process, both of which are capable of general applicability but which are particularly effective in producing our composites. We will describe each in turn in a general fashion and point out specifics which are appropriate to the formation of our composites.

The first method, which we refer to as the "hot filament CVD" process, employs a hot filament for dissociation of appropriate feedstock with subsequent deposition of carbon nanotubes and is most readily understood by reference to FIG. 1. Although FIG. 1 portrays a particular reactor, the following description is generally applicable regardless of reactor specifics. Appropriate feedstock enters the reactor 5 via inlet 3. Reactor pressure is maintained via an automatically controlled throttle valve connected at outlet 4 prior to a vacuum pump not otherwise shown. Reactor pressure is maintained in the region 1 torr up to 1 atmosphere. Lower pressure affords faster diffusion of reactive species (i.e., carbon nanotube precursors) but also a lower concentration of reactive species. The optimum pressure for any given set of conditions will be experimentally determined without excessive effort. A filament of tungsten, tantalum, graphite, or other materials of high melting point is heated to a sufficiently high temperature so that the feedstock is dissociated to provide reactive species. A filament, 1, ca. 1.5 mm in diameter made into a spiral of about 2.5 cm in diameter has been most often used in the practice of our invention, but it should be clear that this is not a particularly critical variable and is susceptible to very broad variation. For example, where the substrate is large the spiral can be wider to cover virtually the entire surface of the substrate, or more than one filament may be used. In any case, the filament needs to be heated to a temperature which will cause decomposition of the feedstock with production of reactive species. We have found a filament temperature in the range of 900–2400° C., and preferably about 2000–2400° C., suffices a temperature which can be readily achieved in, e.g., tungsten filaments by passing a.c. or d.c. current through the filament. In general the filament was heated to a temperature just short of its maximum operating temperature. Generally feedstock flow into the reactor was established prior to heating the filament. Where the feedstock was an organic material containing carbon, hydrogen, and oxygen, or mixture of such materials (vide infra) filament temperature was adjusted so that there is a small net deposition of carbon on the filament to prevent the filament from being oxidized and eroded by the etching radicals produced from the feedstock.

A substrate 2 was placed proximate to but at a distance from the filament. In the general case the substrate may be any of the prior art substrates utilized for carbon nanotube deposition, but where a three dimensional distribution of the carbon nanotubes is desired the preferred substrate is the nonwoven network of randomly oriented fibers connected at their junctions as described above. The appropriate distance between the substrate and heated filament also is determined by trial and error, and depends, inter alia, on the feedstock, filament temperature, reactor pressure, and whether or not carbon nanotube formation is catalyzed, but generally is on the order of several millimeters to a few centimeters. A substrate temperature of 700–1000° C. is common, although substrate temperatures in the range 300° C. up to about 1200° C. may be used. Once feedstock flow is established and the filament heated to 2000° C. or more, the feedstock is dissociated to form carbon nanotube precursors, and when these contact the substrate carbon nanotube deposition begins. The rate of deposition is dependent upon the presence or absence of a catalyst, and generally will proceed over a course of several hours to several tens of hours.

Many variants of the foregoing basic method are possible. For example, the feedstock may be a hydrocarbon, such as acetylene, the traditional feedstock used in CVD methods, or a mixture of hydrocarbons. However, we have found that organic compounds, singly or in combination, containing oxygen in addition to carbon and hydrogen also may be utilized, often advantageously, and for the purpose of this application we shall refer to such materials as "oxyhydrocarbons". Such feedstocks include the lower alcohols, such as methanol, ethanol, and propanol, and the lower ketones, such as acetone, methyl ethyl ketone, and so forth. The lower carbon-number materials are favored simply because they exhibit higher vapor pressure than their heavier counterparts and are thus more readily vaporized in the reactor chamber. One advantage to such feedstocks is that they may be maintained, mixed, and manipulated in their liquid state and introduced into the reactor via a liquid flow controller which affords precise feed control. Once in the low-pressure, high-temperature side of the reactor the feedstock immediately vaporizes and all reactions are gas-phase reactions.

Using methanol as an example, the hot filament dissociates the oxygenated hydrocarbon to afford radicals and molecules such as OH, O, H, C, $CH_3$, and $C_2H_2$ for a net deposition of carbon nanotubes on the substrate. Some of the radicals formed are oxidizing radicals, i.e., they etch the substrate and remove carbon soot as well as deposited nanotubes. Oxidizing radicals also etch the surface of the hot filament, limiting its operational lifetime. Accordingly, the oxygen to carbon ratio in the feedstock is adjusted using components with differing O/C ratios. For example, if a methanol feedstock is found to be too oxidizing, one can add ethanol, $C_2H_5OH$, or even acetone, $C_3H_6O$, to reduce this ratio until there is no net oxidizing environment. In practice, temperature, pressure, and feedstock composition is adjusted until there is a small net carbon deposit on the filament, which ensures optimum carbon nanotube deposition on the substrate. Using this method deposition times vary from several minutes to several tens of hours.

In a variant of the hot filament CVD process the substrate may be coated with a catalyst, both to enhance nanotube deposition rate and to encourage formation of single-walled carbon nanotubes rather than the multi-walled variant. We have found that the catalyst activity increases with decreasing particle size. To minimize catalyst size we have determined that deposition of the catalytic metal as a suitable salt onto the substrate, with subsequent conversion of the metal salt to small particles of elemental metal under reaction conditions, is a very effective and efficient means of putting catalyst onto the substrate surface; vide supra. However, it also is possible to coat the filament with a salt of the catalytic metal, and sublime the metal as it is formed from the hot filament onto the much cooler substrate surface. It also is possible to have two filaments, one coated with a catalytic metal salt and one uncoated, while achieving similar results. We note that even where the filament is not coated with a catalytic metal salt one may employ more than one filament where the surface area of the substrate requires.

Figure 2:
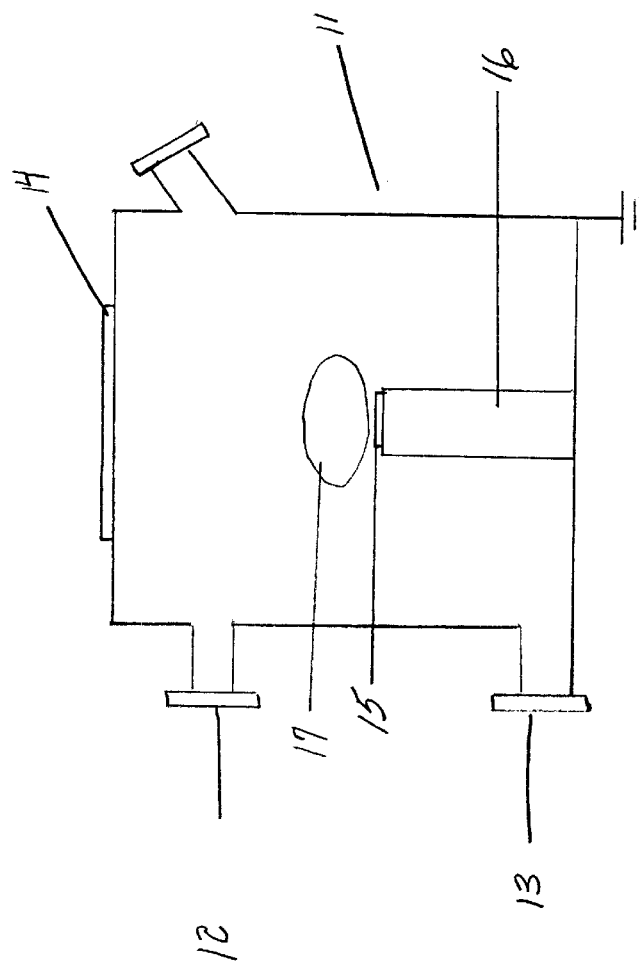
FIG. 2 is a diagram of the apparatus used in the microwave plasma chemical vapor deposition process.
Figure 3:
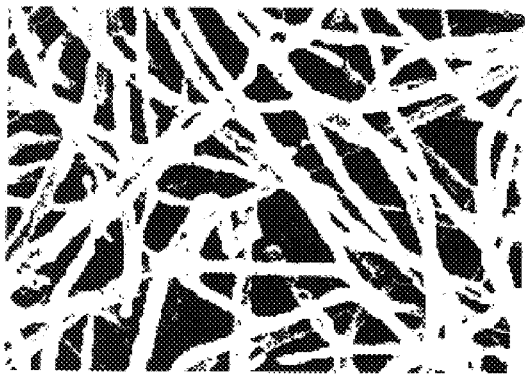
FIG. 3 is a scanning electron microscope (SEM) image of the native fibrous nickel substrate surface.
Figure 4:
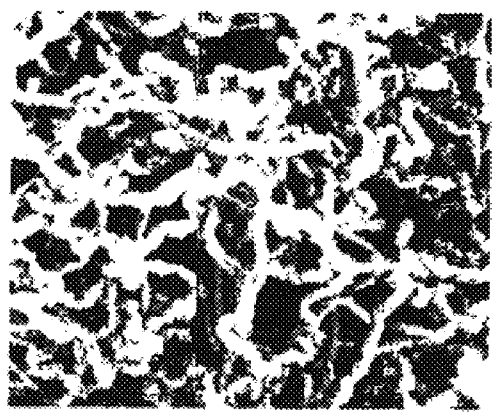
FIG. 4 is an SEM image showing carbon nanotubes, grown by the microwave plasma process, on a fibrous nickel substrate.
Figure 5:
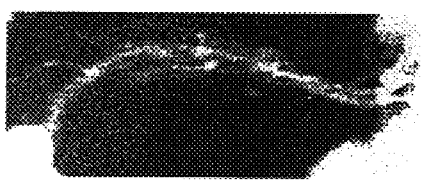
FIG. 5 is an SEM high magnification image showing carbon nanotube growth via the microwave plasma process between nickel fibers.
Figure 6:
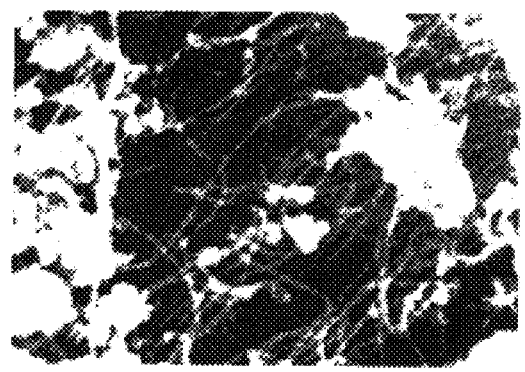
FIG. 6 is an SEM image showing carbon nanotubes brown on nickel chloride coated nickel substrate using the hot filament process.

Another process which is preferred in the preparation of the composites of our invention, but which is of broad generality, is what we call the microwave plasma chemical vapor deposition method. We can illustrate this process with reference to FIG. 2, which shows a typical apparatus used in the practice of this preparative method. Feedstock is introduced to the inlet 12 of a stainless steel reactor chamber 11 that is typically 6" in diameter. Where the feedstock is liquid, as for example a mixture of oxyhydrocarbons, it is stored in a container from which it is fed into the reactor through a liquid flow controller, such as a needle valve. When the liquid enters the low pressure side of the controller it vaporizes to form a gaseous mixture with the same molar composition as the premixed solution. The reactor chamber also has an outlet 13 connected via an automatically controlled throttle valve to a vacuum pump in order to maintain constant pressure within the reactor. Pressures within the reactor are maintained within the range of 1 mtorr and 250 torr.

Microwave power is applied to the reactor chamber through a quartz window 14. A microwave plasma 17 forms in the reactor, and the substrate 15 is placed proximate to, but usually not in contact with, the plasma. The substrate holder 16 may be water cooled so as to maintain a substrate temperature well below that of the plasma. It is generally desired to have the substrate in the temperature range of 500–1200° C. Electrons in the plasma may have a temperature in excess of 10,000° K, whereas the plasma itself, i.e., ions and neutral species, may have a temperature as low as a few tens of degree centigrade. At a higher gas pressure, the temperatures of ions and neutrals rise because of the much more frequent collision between high-temperature electrons and these heavy ions and neutrals. Using methanol as an example of an oxyhydrocarbon feedstock, the plasma will cause dissociation of methanol to release OH, H, O, C, and various other carbon-containing radicals as well as molecular species such as $C_2H_2$. Plasma dissociation of the feedstock affords carbon nanotube precursors which deposit carbon nanotubes upon contact with the substrate. Although carbon nanotubes may deposit on the surface, species such as OH and O radicals also etch the deposited carbon nanotubes, resulting in slow growth (where deposition rate exceeds etch rate) to no growth (where etch rate equals or exceeds deposition rate). A key to the success of this method, which needs to be determined experimentally for a given feedstock, feedstock pressure, and substrate temperature is the position of the substrate relative to the plasma. Where the substrate contacts the plasma deposited materials are immediately etched, and net carbon nanotubes deposition occurs only on the side remote from the plasma. But if the substrate is some distance away from the plasma then carbon nanotube deposition can occur on the side facing the plasma. The plasma ball may or may not touch the substrate surface where carbon nanotube deposition is to occur, depending upon the feedstock and other parameters such as gas pressure and substrate temperature. In the case of plasmas containing a high concentration of strongly oxidizing species, such as OH and atomic oxygen, the growing substrate surface should be remote from the plasma by either setting the back side of the substrate facing the plasma or setting the front side (surface to be deposited with carbon nanotubes) of the substrate facing the plasma but at a sufficient distance, e.g., 3 cm, depending on gas pressure, from the plasma in order to reduce the etching effect by oxidizing plasma species on the growth of carbon nanotubes. In the case of prior art plasmas containing no or low concentrations of oxidizing species, the substrate surface for carbon nanotube growth can either be in contact with the plasma or remote from the plasma depending on experimental parameters. Deposition times of 0.2–100 hours have been employed, although these are not limitations but merely exemplary of our successful utilization of this process. We also mention in passing that microwave energy is not the only way to form a plasma, and that, for example, a radio frequency (RF) or DC discharge may substitute for the microwave discharge in plasma formation.

As was the case in the hot filament process, the oxygen to carbon ratio in the feedstock may be adjusted using components with differing O/C ratios. For example, if a methanol feedstock is found to be too oxidizing, one can add ethanol, $C_2H_5OH$, or even acetone, $C_3H_6O$, to reduce this ratio until there is no net oxidizing environment. In practice, temperature, pressure, and feedstock composition is adjusted along with substrate-plasma separation to ensure optimum carbon nanotube deposition on the substrate. In a variant of the microwave plasma CVD process the substrate may be coated with a catalyst, both to enhance nanotube deposition rate and to encourage formation of single-walled carbon nanotubes rather than the multi-walled variant. As discussed above, the catalyst activity increases with decreasing particle size. To minimize catalyst size we have determined that deposition of the catalytic metal as a suitable salt onto the substrate, with subsequent conversion of the metal salt to small particles of elemental metal under reaction conditions, is a very effective and efficient means of putting catalyst onto the substrate surface; vide supra. Since this aspect has been previously discussed, no further elaboration is needed.

EXAMPLES

Preparation of Fibrous Substrate. This description is representative of the methods employed for the preparation of a nonwoven network of randomly oriented fibers connected at their junctions and used as a substrate for subsequent deposition of carbon nanotubes. The metallic fibers, such as Ni fibers (with other fibers or particles as needed) were mixed with cellulose in an aqueous solvent to form slurry. The slurry was then cast on a filter. The fibrous paper consisting of Ni fibers and cellulose was formed after the solvent was drained. The paper was then tailored to a required size and bonded together during 1100° C. sintering processing. The cellulose is totally burned out during the sintering processing. The tailored paper can be also boned with metallic foil or sheet by the sintering process as mentioned above. The foil or sheet is used as either a current collector or a thermal sink. The paper thickness can be in the range of 5 micrometer to 5 mm. The porosity can be controlled in the range of 30 to 95% by adjusting cellulose concentration of the slurry in the range of 10 wt % to 80 wt % (as cellulose concentration increase, the porosity increases) or by applying pressure to the paper in the range of 10 psi to 1000 psi before the sintering process. With that, the 3-D substrate was fabricated. For an example, 1.68 g 2-micron diameter and 1 mm long Ni fibers were mixed with 1.0 g cellulose in deionized water in a blender for 5 minutes for a 2 gallons slurry. The slurry was then cast on a 200 mesh stainless steel filter. After the water was drained, the paper was heated up to 100 C. to dry. A 1 in diameter sample was cut from the paper and pressed at 60 psi to reduce the thickness to 25 microns. The sample was then attached to a 0.125 Ni foil and is then bonded together during sintering process at 1000° C. for 10 minutes. As a result, a 3-D sample was prepared.

Although we prefer the paper-making method for the preparation of our three dimensional substrates, other methods also can be utilized. For example, a foam process may be used whereby a ceramic or metallic fiber may be mixed with a polymer which affords gaseous products upon pyrolysis. See, e.g., J. P. Greil, J. American Ceramic Soc., 78[4] 835–48(1995) and P. Colombo and M. Modesti, J. American Ceramic Soc., 82[3] 573–8 (1999).

Preparation of Carbon Nanotubes Deposited on Fibrous Substrates. Thermal Chemical Vapor Deposition. This method is the conventional CVD process for carbon nanotube deposition, and as such will be described only briefly. A resistive heater was used to heat quartz tubing within which was placed the fibrous substrate. Gaseous mixtures of acetylene (20–80%) diluted by argon or nitrogen were fed into the chambers and dissociated at a temperature in the range of 300° C. to about 1100° C. Substrate was maintained at a temperature, measured with a thermocouple connected to the substrate holder, equal to or less than the dissociation temperature, and usually in the range of 300 to about 1100° C. Deposition times varied between 20 minutes and 24 hours.

Preparation of Carbon Nanotubes Deposited on Fibrous Substrates. Hot Filament Chemical Vapor Deposition. Sintered 3dimensional macroscopically porous fibrous substrates were coated with nickel chloride or cobalt chloride to provide small nickel or cobalt metallic catalyst particles for the formation of single-walled carbon nanotubes. The substrate was placed at a distance of two centimeters from a tungsten filament of 1.5 mm diameter inside a vacuum chamber. The chamber was evacuated by a mechanical pump to achieve a base pressure of 30 m Torr. A liquid premix of 100 grams of methanol and 6 grams of ethanol was fed into the chamber through a one quarter inch diameter Teflon tubing and through a needle valve that adjusted the flow rate of the liquid from the liquid container into the low pressure side of the vacuum chamber. The flow rate was set so that with the pumping capacity of the vacuum pump and the regulating capability of a throttle valve between the vacuum pump and the vacuum chamber, the desired gas pressure was achieved inside the vacuum chamber. Typically, for our vacuum chamber, it took two to twenty hours to consume 100 grams of pre-mixed liquid. The chamber pressure was typically set at 100 Torr, although it can be higher or lower. An AC electrical current of 80–100 Amperes was passed through the tungsten filament to heat the filament to about 2000° C. After one hour deposition, the electrical current to the filament was turned off and the liquid flow to the chamber was also turned off allowing the chamber to be evacuated by the vacuum pump. After the tungsten filament and the substrate cooled down to near ambient temperature, the vacuum chamber was back filled with air and opened for removing the specimen from the chamber. The specimen was characterized by measuring the electron field emission from the specimen to have a turn-on electric field of approximately 1 volt per micron of macroscopic electric field, i.e., the ratio of the applied voltage to the distance between the anode and the specimen, which served as the cathode. Scanning electron microscopy was also used to observe the shape and dimension of the carbon nanotubes on the substrate. Both single-walled and multi-walled carbon nanotubes were found to be deposited on the substrate.

Preparation of Carbon Nanotubes Deposited on Fibrous Substrates. Microwave Plasma Chemical Vapor Deposition. Sintered 3-dimensional macroscopically porous fibrous substrates of about one inch in diameter were coated with nickel chloride or cobalt chloride to provide small nickel or cobalt metallic catalyst particles for the formation of carbon nanotubes. The substrate was placed on a substrate holder on the top of three spacers of about 0.1 cm thick. The fibrous nickel surface was placed downward. The chamber was evacuated by a mechanical pump to achieve a base pressure of 30 m Torr. A liquid solution premixed with 100 grams of methanol and 6 grams of ethanol was fed into the chamber through a one quarter inch in diameter Teflon tubing and through a needle valve that adjusted the flow rate of the liquid from the liquid container into the low pressure side of the vacuum chamber. The flow rate was set so that with the pumping capacity of the vacuum pump and the regulating capability of a throttle valve between the vacuum pump and the vacuum chamber, the desired gas pressure is achieved inside the vacuum chamber. Typically, for our vacuum chamber, it took two to twenty hours to consume 100 grams of pre-mixed liquid. The chamber pressure was typically set at 40 Torr, although it can be higher or lower. A microwave power supply fed 600–1200 watts microwave at 2.45 GHz to the vacuum chamber which is a six inch diameter cylindrical cavity for the microwave. The microwave cavity and the microwave power formed a high electric region near the top of the substrate holder to ionize the vapor of the liquid premix and to form a hemispherical shaped plasma ball sitting on the top of the backside of the substrate. The plasma decomposed the vapor generating the carbon containing species that diffused through the opening between the substrate and the substrate holder that are separated from each other by three 0.1 CM thick stainless steel spacers. After one hour of deposition, the microwave power was turned off and the liquid flow to the chamber was also turned off allowing the chamber to be evacuated by the vacuum pump. After the substrate cooled down to near the ambient temperature, the vacuum chamber was back filled with air and opened for removing the specimen from the chamber. The specimen was characterized by measuring the electron field emission from the specimen to have a turn-on electric field of approximately 1 volt per micron of macroscopic electric field, i.e., the ratio of the applied voltage to the distance between the anode and the specimen, which served as the cathode. Scanning electron microscopy was also used to observe the shape and dimension of the carbon nanotubes on the substrate. Both single-walled and multi-walled carbon nanotubes were found to be deposited on the substrate forming 3-dimensional sponge-like network.

Electron Emission Measurement. Specimens were loaded into a high vacuum chamber in which field emission characteristics of the samples were measure. Pressure in the chamber was as low as $10^{-7}$ Torr. A tungsten rod with a hemispherical tip was used as the anode. A digital dc power supply (Stanford Research Systems PS235) was used to apply a voltage between the anode and cathode. A Keithley 485 picoammeter was used to measure the emission current. By using a general purpose interface card, the power supply and the ammeter were controlled by a desktop computer which also recorded voltage and current data. The distance between the anode and cathode was controlled and measured by a linear feed-through on which the tungsten rod was mounted. By turning the feed-through, the tungsten rod can be moved up and down and the travel distance was recorded.

Table 1 summarizes representative results of various samples. $E_{to}$ is the turn-on electric field, defined as the electric field at which emission current starts to rise rapidly according to the slope of the current vs. electric field plot, and $\beta$ is the electric field enhancement factor. In all cases a nickel wire fiber substrate was used. Where this was coated with catalyst (performed in situ by "painting" the nickel fiber with a salt of the metal used as catalyst) the metal is identified in the substrate column.

TABLE 1

Field Emission Properties of Samples

| Method | Substrate | Substrate Temperature (° C.) | Deposition time | Feedstock | Pressure (torr) | $E_{to}$ (V/micron) | Field Enhancement factor | Comments |
|---|---|---|---|---|---|---|---|---|
| Thermal CVD | Ru chloride coated Ni fibrous substrate | 600 | 3 hrs | 40 sccm acetylene and 100 sccm nitrogen | 100 | 2.2 | 1500 | |
| Thermal CVD | Ru chloride coated Ni fibrous substrate | 600 | 35 min. | 40 sccm acetylene and 100 sccm nitrogen | 100 | 2.4 | 1100 | |
| Thermal CVD | Cobalt chloride coated Ni fibrous substrate | 600 | 35 min | 40 sccm acetylene and 100 sccm nitrogen | 100 | 1.1 | 3200 | |
| Thermal CVD | Ru chloride coated Ni fibrous substrate | 600 | 35 min | 40 sccm acetylene and 100 sccm nitrogen | 100 | 2.4 | 1150 | |
| Thermal CVD | Ni chloride coated Ni fibrous substrate | 600 | 35 min | 40 sccm acetylene and 100 sccm nitrogen | 100 | 2.0 | 1400 | |
| Hot filament CVD | Ni chloride coated Ni fibrous substrate | 900 | 80 min | Mixture of 100 g methanol and 6 g ethanol | 100 | 1.7 | 760 | Substrate placed under filament, facing up. |
| Hot filament CVD | Ni chloride coated Ni fibrous substrate | 1000 | 80 min. | Mixture of 100 g methanol and 6 g ethanol | 100 | 3.9 | 340 | Substrate placed over filament, facing up and not exposed to the filament. |
| Plasma CVD | Cobalt chloride Coated Ni Fibrous substrate | 900 | 45 min. | Mixture of 100 g Methanol and 6 g ethanol | 40 | 0.8 | 2800 | Substrate was facing down and not exposed to the plasma |

What is claimed is:

1. A composite having a three dimensional distribution of carbon nanotubes dispersed throughout said composite comprising:
   a. a nonwoven network of randomly oriented fibers selected from the group containing metal fibers, ceramic fibers, metal alloy fibers, composites of metal graphite fibers, and combinations thereof, connected at their junctions to afford macropores in spaces between said fibers; and
   b. nanotubes deposited on said fibers, where a portion of said carbon nanotubes extend into said macropores.

2. The composite of claim 1 where the fiber is a metal fiber.

3. The composite of claim 2 where the metal fiber is selected from the group consisting of nickel, molybdenum, stainless steel, copper, tungsten, aluminum, titanium, vanadium, chromium, iron, cobalt, zinc, zirconium, niobium, ruthenium, rhodium, palladium, silver, cadmium, indium, tin, hafnium, tantalum, rhenium, osmium, platinum, gold, antimony, beryllium, iridium, silicon, and combinations thereof.

4. The composite of claim 3 where the metal fiber is nickel.

5. The composite of claim 1 where the fiber is a ceramic fiber.

6. The composite of claim 5 where the ceramic fiber is selected from the group consisting of silica, magnesia, alumina, titania, aluminosilicates, aluminophosphates, silicaaluminophosphates, clays, boron nitride, aluminum nitride silicon nitride, silicon carbide, and combinations thereof.

7. The composite of claim 1 where the fiber has a diameter from about 0.5 to about 50 microns.

* * * * *